Feb. 5, 1957 E. LOVELL 2,780,754
ELECTRONICALLY CONTROLLED ELECTRO MAGNETIC STEPPING APPARATUS
Filed Feb. 18, 1953 2 Sheets-Sheet 1

INVENTOR
ERNEST LOVELL
BY Laurence R. Brown
ATTORNEY

Feb. 5, 1957 E. LOVELL 2,780,754

ELECTRONICALLY CONTROLLED ELECTRO MAGNETIC STEPPING APPARATUS

Filed Feb. 18, 1953 2 Sheets-Sheet 2

INVENTOR
ERNEST LOVELL
BY
Laurence R. Brown
ATTORNEY 2,780,754
Patented Feb. 5, 1957

2,780,754

ELECTRONICALLY CONTROLLED ELECTRO-MAGNETIC STEPPING APPARATUS

Ernest Lovell, Pedricktown, N. J., assignor to Burroughs Corporation, a corporation of Michigan Application February 18, 1953, Serial No. 337,551
11 Claims. (Cl. 317—136)

This invention relates generally to electronic control systems and more particularly to stepping devices comprising electronic impulse generators and associated impulse driven electro-magnetic stepping mechanisms.

Electro-magnetic stepping switches have become extensively used in the art for relatively low speed switching purposes. Higher speed switching is, in general, accomplished by electronic commutating circuits. However, switching speeds which lie above the prior art mechanical limitations of electro-magnetically operated switches are not generally economically feasible with commutator type circuits, since high power is generally required and the circuitry becomes unduly complex when designed to provide a large number of switching steps.

It is therefore an object of this invention to provide improved, reliable and simplified stepping systems comprising high speed electro-magnetic stepping means.

In order to provide high speed long life stepping of electro-magnetic devices, electronic control circuits are utilized. When electro-magnetic switches are so controlled, it is necessary to provide accurately defined driving pulses having suitable leading edges and affording considerable driving power. Synchronized control of the pulses is desired so that stepping may be correlated with other functions of electronic systems.

It is therefore another object of the invention to provide improved electronic actuating circuits adapted for use with electro-magnetic stepping means.

Electronic actuating means, in general, provide reliable switching speeds in excess of the mechanical limitations of electro-magnetically operated stepping devices.

Accordingly, it is desirable and is therefore an object of the invention to provide, in connection with electronic driving circuits improved mechanical stepping means operable at higher speeds than heretofore attainable.

High speed mechanical stepping switches in general require extensive driving power since rapid transitions must be made from one stable rest position to another. This requires, from electro-magnetic type advancing means, large speed-limiting operating torques, which are possible only with a large amount of inductance in electro-magnetic driving relay means. Accordingly, the rise time of exciting pulses from electronic impulse generators is also limited thereby further reducing the eventual stepping speed.

A further object of the invention therefore is to provide mechanical stepping means having decreased mechanical inertia and associated decreased inductance in electro-magnetic driving relay windings so that higher operating speeds are readily attainable.

Higher speed operation is attained therefore by driving the stepping means from one stable position to another in two steps. To accomplish this at highest speeds, electronic control means is desired which provides two successive driving pulses in response to a single trigger pulse.

It is therefore another object of the invention to provide unistable state discharge circuits providing a pair of successive driving pulses.

In accordance with the invention there is, therefore, provided a novel unistable state gaseous tube impulse generator generating a pair of successive high power actuating pulses in response to a single external trigger pulse for magnetically exciting a corresponding pair of relay windings. A claw and escapement or other suitable advancing mechanism is coupled for actuation by the relays to advance the stepping means from one stable position to another in two steps, whereby peak driving power is decreased and switching speeds of the system are greatly increased.

Other objects and features of advantage of the invention will be presented throughout the following specification. The detailed description will be more readily understood when considered in connection with the accompanying drawing, in which like reference characters are used throughout the respective views to designate similar components, and in which.

Figure 1:
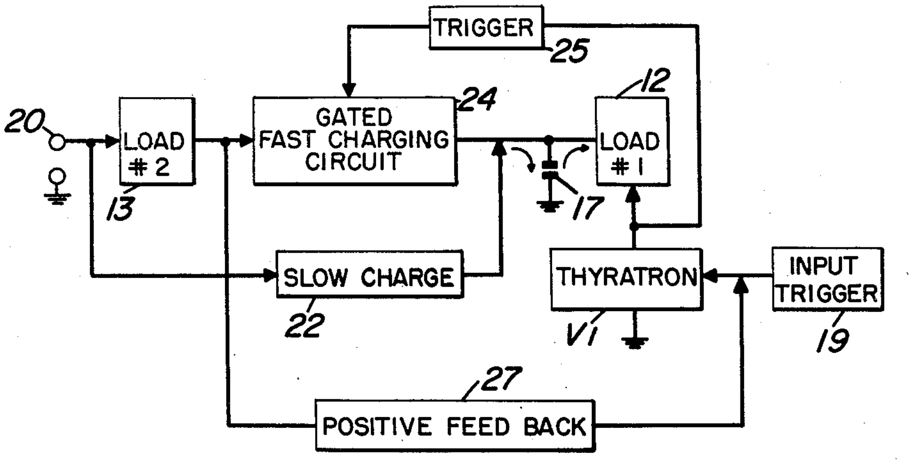
Fig. 1 is a block diagram of an electronic actuating system constructed in accordance with the invention for providing a pair of successive pulses to two separate load circuits.

The block circuit diagram of Fig. 1 is required to provide a pair of successive driving pulses having considerable power to a corresponding pair of load devices 12 and 13. The first load device 12 is driven by a grid-controlled thyratron or similar gaseous discharge tube V1. Discharge current is provided for the thyratron V1 by a storage capacitor 17. Discharge is initiated in response to a suitable synchronizing or trigger pulse from the input trigger circuit 19, which will cause the thyratron discharge current to flow through load device 12.

The capacitor 17 is re-charged from a suitable power supply connected to terminal 20 after the thyratron V1 is extinguished. When low speed operation is desired, a slow charge circuit 22, generally consisting of a high impedance such as a resistor, effectively returns the capacitor 17 to full charge during the thyratron rest period. However, for higher operating speeds a fast charging circuit 24 is essential. This circuit may comprise a suitable unidirectional device such as a tube, and when called upon to deliver high power pulses to the load 13 is preferably another thyratron tube.

In accordance with the present invention a pair of successive driving pulses is desired. To assure provision of two successive pulses, the fast charging circuit 24 is gated by means of internal trigger pulses derived from the anode circuit 12 of thyratron V1 at the time thyratron V1 is extinguished by trigger circuit 25. In this manner a suitable current pulse is initiated in charging circuit 24 to restore the charge on capacitor 17 and actuate the second load circuit 13. The slow charge circuit 22 serves to maintain full charge on the capacitor 17 should large time intervals be interspersed between successive input trigger pulses, as may occur between switching operations in stepping switch systems. When continuous cyclic actuation of the system is required, positive feedback may be obtained by way of circuit 27 to the thyratron input control lead to cause automatic oscillation subject to synchronizing control by the input trigger circuit 19.

Figures 2, 2A:
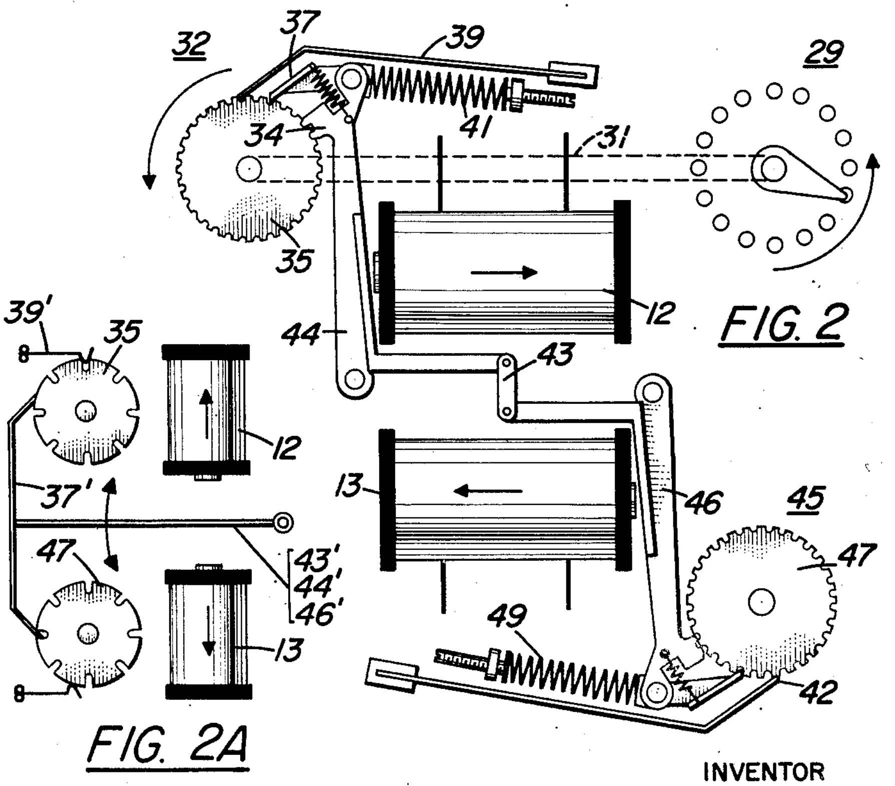
Figs. 2 and 2A are diagrammatic views of improved mechanical stepping means afforded by the invention.

In a system for providing high speed stepping, the mechanism of Fig. 2 may be actuated by the hereinbefore described circuit. The relay clapper devices have inductive winding load circuits 12 and 13 driven by the successive driving pulses. Switch contacts 29 or other suitable step-by-step means may then be advanced under electronic control by a stepping shaft 31 driven by associated claw and escapement means 32. Counterclockwise rotation is effected by the actuating electro-magnet 12, which serves to separate the escapement arm 34 from the toothed gear 35 and cock the claw 37 into position in a different driving notch. The spring retainer 39 retains gear 35 in its stable position.

During conventional operation the electro-magnet clapper of winding 12, when cocking the claw 37, compresses the spring 41 which proceeds upon de-energization of the relay winding 12 to drive the gear 35 forcibly into its next successive stable rest position.

In accordance with the present invention, however, spring action does not impart the complete driving force, and therefore the force delivered by electro-magnet 12 to cock the claw spring may be made very much smaller than usually required in compressing a driving spring. Rather, a separate relay is provided to successively exert driving force upon the claw 37. Successive driving pulses to both the electro-magnets 12 and 13 will, in two corresponding steps, therefore, cock the mechanism into a semi-stable position 42, and by way of the simple mechanical linkage 43 of this embodiment drive the gear 35 forward into a stable position. Each relay clapper arm 44 and 46 comprises an L-shaped first class lever coupled by the pivoted arm 43 so that attraction of either clapper arm by its corresponding relay winding will force the other clapper arm away from its relay winding. The driving force for each relay is thereby substantially decreased as well as the length of the stroke.

By decreasing the mechanical stiffness of the system, much faster reliable driving speeds are attainable than heretofore possible. In addition, the required driving pulse rise times effective in driving the mechanism are decreased because less inductance is necessary in the relay windings with two stroke operation. Thus, easily attainable high frequency electronic impulses may be used to drive mechanical means into a plurality of high speed stepping positions with a single unistable state electronic circuit providing two successive pulses.

In many instances it is desirable to provide a pair of synchronized stepping switches with alternate phasing of the stable positions of two respective switches. Such is accomplished in accordance with the present invention by addition of the auxiliary stepping means 45, which is cocked by means of the electro-magnet 13 at the time the stepping means 32 is driven. The auxiliary stepping gear 47 is shown in an intermediate position of its driving stroke. Cocking of the auxiliary stepping means 45 has preceded, and continued drive of the auxiliary stepping means 45 into its stable position occurs simultaneously with the cocking of stepping means 32. It is noted that use of the spring 49, which becomes compressed when the spring 41 is expanded and vice versa, results in an energy balance so that the forces necessary for driving the stepping means are minimized. The springs may therefore be used to maintain balance between the two stepping means and to afford centering adjustment, and do not necessitate appreciable additional driving power. Accordingly, it is clear that much faster mechanical actuation may be realized in accordance with this phase of the present invention than with conventional spring actuated drive means.

Alternative stepping means may be provided such as that of Fig. 2A, wherein the claw and escapement driving means is replaced by a simpler driving arm, and a single clapper driven by both relay windings 12 and 13 serves the same purpose as the mechanical linkage 43, 44, 46. A detent spring 39' tends to hold the gear 35 in the shown stable position while being cocked, and while gear 47 is being driven to the next stable position. The modified claw drive 37' is laterally flexible enough to spring back across the gear teeth to engage a driving notch of the gear during the stroke provided by one relay winding and to impart a longitudinal driving force to the gear during the successive stroke provided by the other relay winding.

Figures 3, 4:
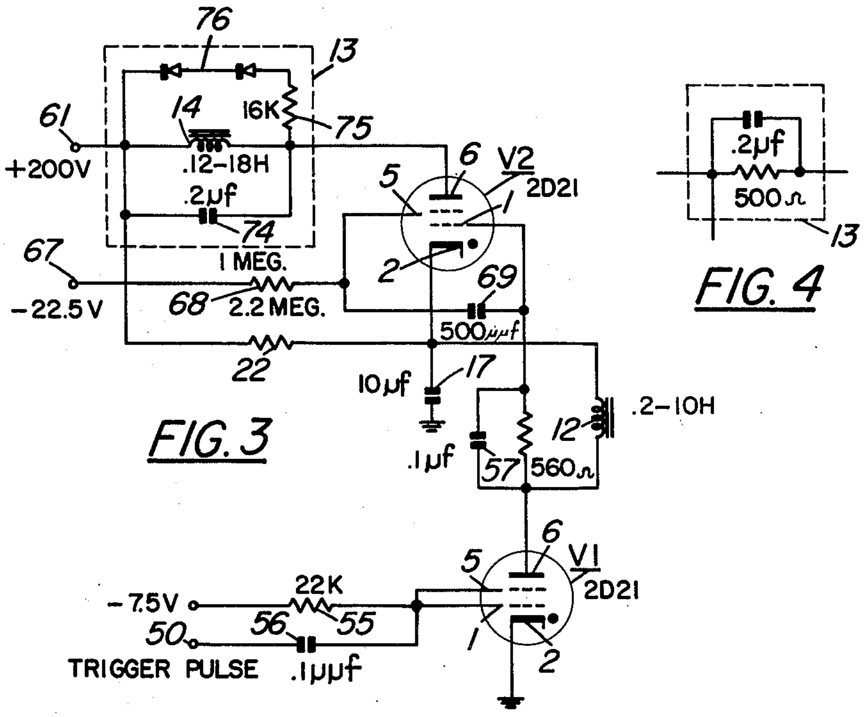
Fig. 3 is a detailed schematic diagram of a thyratron stepping control circuit.
Fig. 4 is a schematic circuit diagram of a modification of the invention illustrated in Fig. 3.
Figure 5:
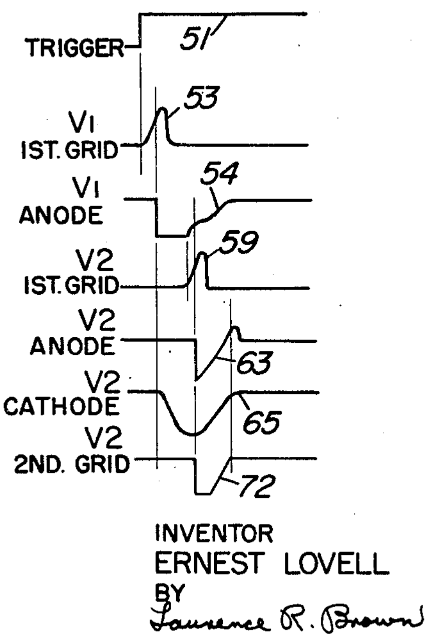
Fig. 5 is a waveform chart illustrating operation of the circuit of Fig. 3.

The schematic circuit of Fig. 3 together with the explanatory waveforms of Fig. 5 illustrates operational principles and desirable details of circuits for providing successive driving pulses with a pair of gaseous discharge tubes coupled in series circuit across a power supply. Those circuit component values found suitable in one embodiment for operation in accordance with the principles of the invention are designated on the drawing. The circuit schematically represents a unistable state device providing a pair of successive pulses in response to input trigger pulses and automatically returning the tubes to their original state ready for a succeeding triggered cycle of operation. Consideration of the constructional details and the mode of operation of this embodiment will enable those skilled in the art to construct modifications suitable for specific applications without departing from the scope or spirit of the present invention.

The initial grid-controlled gaseous tube V1 is adapted for obtaining discharge current from the storage capacitor 17 which is connected from ground to the circuit serially coupling the common anode 6 and cathode 2 of series tubes V1 and V2. As outlined above, the discharge current of tube V1 drives the inductive load 12. The capacitor 17 is therefore chosen to deliver the optimum discharge current to the particular load circuit utilized. The tube is adapted by means of input terminal 50 and associated circuitry to utilize the input trigger waveform 51 of Fig. 5 for initiating discharge. A pulse effective at the control grid 1 of the thyratron V1 to initiate discharge is shown in waveform 53 as derived from the integrating circuit comprising resistor 55 and capacitor 56, resulting in a typical waveform 54 at the anode 6.

As the potential of capacitor 17 falls it reaches a point sufficiently more negative than the first grid 1 of thyratron V2 so that the tube fires. The potential difference between the first grid 1 and cathode 2 that is required for firing depends upon the potential at the second grid 5, which is provided by the bias supply 67 and resistor 68. The circuit parameters are so chosen that a small current is still flowing from capacitor 17 through inductive load 12 and thyratron V1 at the time thyratron V2 fires. Thyratron V2 upon firing draws a heavy first grid current through capacitor 57, and the potential of the anode 6 of thyratron V1 drops abruptly, extinguishing thyratron V1. In effect the current from load 12, which had been passing through thyratron V1 shifts abruptly to condenser 57 and causes the subsequent rapid decay of the current in inductive load 12.

Now that the thyratron V2 is ignited, charging current flowing from the supply terminal 61 through thyratron V2, and into storage capacitor 17, drives the auxiliary load inductor 14 with the waveform 63, thereby effecting with thyratron V1 successive drive of two separate load devices. The resistor 22 serves to maintain the full charge on capacitor 17 after the thyratron V2 is extinguished, and during long rest periods of the circuit. It is noted that little standby power except for tube heater power is thus consumed and therefore highly efficient operation is obtained. Also the resistor 22 functions to assure that the thyratron V2 remains cut off before a succeeding trigger pulse arrives at grid 1, by maintaining the cathode 2 at substantially anode potential, while the potential of the second grid 5 is more negative than either.

When a separate screen grid biasing potential is utilized at terminal 67, it has been found that an additional stabilizing capacitor 69 connected between the screen grid 5 and control grid 1 of the thyratron V2 affords improved operation by assuring that the circuit continues operation in the presence of triggering pulses which might possibly arrive before a complete discharge cycle is completed. This circuit results in a screen grid potential change similar to that illustrated by waveform 72.

The load circuit 13 includes a capacitor 74 shunting the inductive load, to permit thyratron V2 to ignite rapidly, thereby insuring that thyratron V2 will extinguish. Diodes 76 are so polarized to dissipate with resistor 75 any overshoot of waveform 63 caused by extinguishing of thyratron V2 and the resulting collapse of field about inductance 14. These devices are utilized to obtain control of the driving waveform shape when the inductive discharge is not desired to establish triggering of the thyratron V1, as indicated by the positive feedback circuit 27 of Fig. 1.

The hereinbefore described circuit provides successive pulses at the respective load inductors 12 and 14 upon triggering of the thyratron V1 from a suitable external control circuit. Should it be desired to provide a single output pulse for each trigger pulse, such is obtained at the load circuit 12. In this case, the dissipative load circuit 13 of Fig 4 may be substituted for the corresponding circuitry of Fig. 3.

Figure 6:
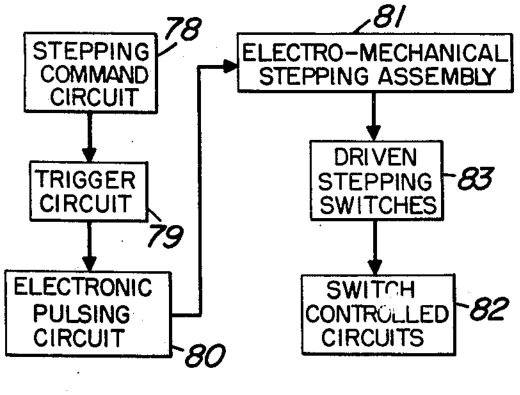
Fig. 6 is a block diagram of a system embodying the invention.

The electronic control circuit provided in accordance with this invention affords reliable high speed actuation of electro-mechanical stepping means with high powered driving pulses having well defined leading edges. The different embodiments of the invention therefore are highly suitable for use in systems of the general type illustrated in the block diagram of Fig. 6, wherein a suitable stepping command circuit 78 is utilized by means of a trigger circuit 79 to trigger an electronic pulsing circuit 80, corresponding to the thyratron discharge circuit of this invention. The two successive pulses provided by circuit 80 afford high speed drive of the electro-mechanical stepping assembly 81 by advancing it from one position to another in two steps. Any suitable switch control circuit 82, therefore, may be actuated at high speeds by stepping switches 83 coupled to the stepping assembly 81 without the provision of complex electrical circuitry.

It is readily recognized from the foregoing description of various aspects of the invention that there is provided a novel improved high speed system comprising a simplified electronic impulse generator and associated electro-mechanical stepping means which in combination efficiently increase stepping speeds attainable with mechanical stepping means.

Those features believed descriptive of the nature of the invention are defined with particularity in the appended claims.

What is claimed is:

1. A high speed relay actuated stepping system comprising, a shaft adapted to be rotated about its axis successively into a plurality of stable positions, advancing means including an escapement mechanism coupled to drive said shaft, a pair of relay devices, reciprocable linkage operatively engaging the clapper of each relay and being adapted to be successively rocked in alternate directions to drive said escapement mechanism, a first of said relays adapted to cock said escapement mechanism prior to advancing said shaft, the second of said relays coupled to the first relay and being adapted thereby to advance said shaft in response to actuation of the first relay, an electronic means supplying successive electrical pulses first to one and then to the other of said relay devices to thereby initiate alternate operation of the relay devices.

2. A system as defined in claim 1 wherein said driving means comprises a pair of series coupled thyratron tubes, said tubes being electrically connected to a common RC network in respectively opposite polarities and means associated with each of said tubes permitting a second of said tubes to be discharged at the time of extinction of discharge in the first tube.

3. A relay actuated stepping system comprising a pair of shafts adapted for successively resting in a plurality of stable positions, a pair of electromagnets, each electromagnet being provided with an individual clapper, reciprocable linkage operatively interconnecting said clappers, energization means for successively actuating said electromagnets with a pair of driving pulses, a mechanism operatively connecting the clapper of each electromagnet with a separate stepping shaft to drive each shaft in response to movement of its respective clapper, and means adapted to cause at least one of said stepping shafts to advance from one stable position to the next in two steps attained by two successive actuations of said clapper from said energization means.

4. A system as defined in claim 3 wherein said reciprocable linkage comprises two lever arms coupling said clappers together to impart unidirectional driving actuation from one clapper to the other, and respective electrical windings on said electromagnets adapted for successive energization from said pulses.

5. A system as defined in claim 4 including an individual balanced spring biasing means connected to a separate one of said clapper arms in a manner such that as one spring means is compressed the other is expanded, whereby high stepping speeds are readily attainable.

6. A system as defined in claim 4 wherein means is provided to advance each stepping shaft from one stable position to the other in respective cocking and driving steps, wherein said means is adapted to provide a cocking step with one shaft in connection with a driving step with the other shaft, whereby alternate phasing of the stable positions of said shafts is provided.

7. A relay actuated stepping unit comprising a rotary shaft two relays having a pair of corresponding actuating windings, means providing successive actuating pulses to said windings, an advancing mechanism for stepping said rotary shaft into a plurality of stable positions, and a mechanical linkage electro-magnetically operated by said relay windings to set said advancing mechanism in position with actuation of a first relay and to advance said rotary shaft to the next stable position with actuation of the other relay.

8. A stepping switch unit comprising in combination a switch member adapted to be indexed to a number of different positions, an advancing mechanism to cause the switch to attain a plurality of stable positions, and electronic means coupled to actuate said advancing mechanism from one stable position to the next in two steps whereby the attainable stepping speed is greatly increased.

9. A unistable state circuit comprising a first grid controlled gaseous tube, means to apply an input trigger potential to said tube, a capacitor connected in series with the anode of said tube to supply discharge current thereto, a load circuit connected in the discharge path of the tube, a direct current source, a second grid controlled gaseous tube connected to charge said capacitor from said direct current source, two relays with windings comprising inductive load devices connected respectively in series with the discharge paths of each tube, electrical circuit means coupled from the load circuit of the first tube to the grid input circuit of the second tube to energize the second tube and automatically extinguish the discharge in the first tube, whereby a single input trigger pulse causes both said tubes to discharge in succession and return to a stable state wherein said capacitor is fully charged, and a stepping switch adapted to attain a plurality of successive stable rest positions comprising a mechanism coupled for actuation by each of said relays successively into cocked and driving positions, whereby each input trigger pulse causes two successive actuating strokes to advance the stepping switch to a succeeding stable rest position.

10. A high speed stepping system comprising, in combination, a shaft adapted to be stepped to a plurality of stable positions, means for rotating the shaft from rest in each stable position to rest in the next adjacent stable position, a pair of pulse actuated relays coupled to the rotating means, one of said relay means being operable to cause operation of the rotating means and the other relay being operable to cause the completion of the operation of the rotating means, and electronic means coupled to the relays and operable to provide successive actuating pulses alternately to one relay and then to the other relay.

11. A relay actuating stepping device comprising, in combination, two magnetic relays each having an actuating winding, means for successively energizing said windings, a mechanism for stepping a rotary shaft in one direction around its axis of rotation, and mechanical means responsive to the energization of said relay windings and operable by the first of the two windings to be energized to set the mechanism in position for a driving motion and operable by the second of the two windings to be energized to cause the mechanism to drive the rotary shaft to the next step of its rotary movement.

References Cited in the file of this patent

UNITED STATES PATENTS

| | | |
|---|---|---|
| 2,461,266 | Gay | Feb. 8, 1949 |
| 2,494,520 | Riggen | Jan. 10, 1950 |
| 2,509,269 | Hana | May 30, 1950 |